United States Patent
Hiramoto (10) Patent No.: US 8,284,439 B2
(45) Date of Patent: Oct. 9, 2012

(54) IMAGE FORMING METHOD, IMAGE FORMING PROGRAM, AND IMAGE FORMING APPARATUS

(75) Inventor: Hirotsugu Hiramoto, Kobe (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 675 days.

(21) Appl. No.: 12/358,626

(22) Filed: Jan. 23, 2009

(65) Prior Publication Data

US 2009/0252507 A1 Oct. 8, 2009

(30) Foreign Application Priority Data

Jan. 24, 2008 (JP) .................................. 2008-013963

(51) Int. Cl.
*G06K 15/00* (2006.01)
(52) U.S. Cl. ...................... 358/1.18; 101/482; 270/58.32
(58) Field of Classification Search ........................ None
See application file for complete search history.

(56) References Cited

U.S. PATENT DOCUMENTS

| | | | | |
|---|---|---|---|---|
| 4,372,696 A | * | 2/1983 | Pou | 400/124.07 |
| 5,084,340 A | * | 1/1992 | Light | 428/32.15 |
| 6,299,401 B1 | * | 10/2001 | Pacione | 412/1 |
| 2003/0070146 A1 | * | 4/2003 | Sato et al. | 715/525 |
| 2008/0320386 A1 | * | 12/2008 | Balzano et al. | 715/256 |

FOREIGN PATENT DOCUMENTS

| | | |
|---|---|---|
| JP | 2003-260843 A | 9/2003 |
| JP | 2004-199359 A | 7/2004 |

* cited by examiner

*Primary Examiner* — Marivelisse Santiago Cordero
*Assistant Examiner* — John Wallace
(74) *Attorney, Agent, or Firm* — Buchanan Ingersoll & Rooney PC (57) ABSTRACT

An image forming method for printing on tab paper with a main body for a text and an tab for an index, comprising the steps of: 1) acquiring index information on the index to be printed on the tab, and 2) printing the index information acquired in the step 1) on the tab paper, wherein first index information composed of the initial part of the index information that can fit into the tab, is printed on the tab, and second index information containing at least the remaining part of the index information after depriving it of the first index information, is printed on the main body.

18 Claims, 9 Drawing Sheets

IMAGE FORMING METHOD, IMAGE FORMING PROGRAM, AND IMAGE FORMING APPARATUS

CROSS-REFERENCE TO RELATED APPLICATION

This application is based on Japanese Patent Application No. 2008-013963 filed on Jan. 24, 2008, the contents of which are incorporated herein by reference.

BACKGROUND

1. Technical Field

The present invention relates to an image forming method, an image forming program, and an image forming apparatus.

2. Description of Related Art

In recent years, there have been various printers, copiers and the likes which can perform a tab printing function to insert tab paper desired positions in a printed document with a plurality of pages and print a letter string and such on a tab of the tab paper. Use of this tab printing function saves user's trouble of inserting tab paper into specific positions in a printed document or writing an index on a tab by hand, thereby improving user-friendliness in creating a printed document with tab paper.

However, printing necessary amount of information in a tab with a generally small area, involves user's troubles of giving precise instruction regarding settings on character size, font, the number of letters and so forth. This problem becomes more prominent as the number of tabs to be inserted into a document is larger, and the area of each tab is smaller.

In this respect, Unexamined Publication No. 2004-199359 discloses a printer which is capable of scanning the information on the tab where an index should be printed, and making use of the scanned information to generate and print an index image with a scale-up or scale-down size. This technique enables a printer to automatically reduce the size of the index which will not fit into the tab, and ensures that the index will be printed on the tab in its entirety. However, the printed index according to this technique may be made illegible due to excessive reduction in its size.

Unexamined Publication No. 2003-260843 also discloses an image forming apparatus comprising a control unit capable of identifying the maximum number of characters that can be printed within a printable area of a tab, in order to stop printing an index with a number of characters beyond the maximum number. However, this technique can only prohibits a printer from printing an index with a size which can not fit into a tab, and still involves user's trouble of repeating change of settings on character size and so forth, in order to achieve desired printing results.

The present invention is made to solve the abovementioned problems of the prior art, and it is an object of the present invention to provide an image forming method, an image forming program, and an image forming apparatus provided with a tab printing function to print desired information on tab paper in an illegible and intact manner, without involving user in troublesome settings.

SUMMARY

To achieve at least one of the above mentioned objects, the image forming method for printing on tab paper with a main body for a text and a tab for an index, reflecting an aspect of the present invention, comprises the steps of: 1) acquiring index information on an index to be printed on said tab; and 2) printing said index information acquired in said step 1) on said tab paper. In said step 2), first index information composed of the initial part of said index information that can fit into said tab, is printed on said tab, and second index information comprising at least the remaining part of said index information after depriving it of said first index information, is printed on said main body.

In the aforementioned image forming method, said second index information is preferably the entirety of said index information.

In the aforementioned image forming method, said second index information is preferably the remaining part of said index information after depriving it of said first index information.

In said step 2) of the aforementioned image forming method, said second index information is preferably printed on the top of said main body.

In said step 2) of the aforementioned image forming method, said second index information is preferably printed in an area within said main body adjacent to said tab so that said second index information will follow said first index information.

In said step 2) of the aforementioned image forming method, said first index information is preferably printed after having its fraction replaced by other information that can give user a sign of presence of said second index information.

In said step 2) of the aforementioned image forming method, said second index information is preferably printed on said main body in an overtype mode.

In said step 2) of the aforementioned image forming method, said second index information is preferably printed on said main body in a transparent mode.

The objects, features, and characteristics of this invention other than those set forth above will become apparent from the description given herein below with reference to preferred embodiments illustrated in the accompanying drawings.

DETAILED DESCRIPTION

The embodiment of this invention will be described below with reference to the accompanying drawings.

Figure 1:
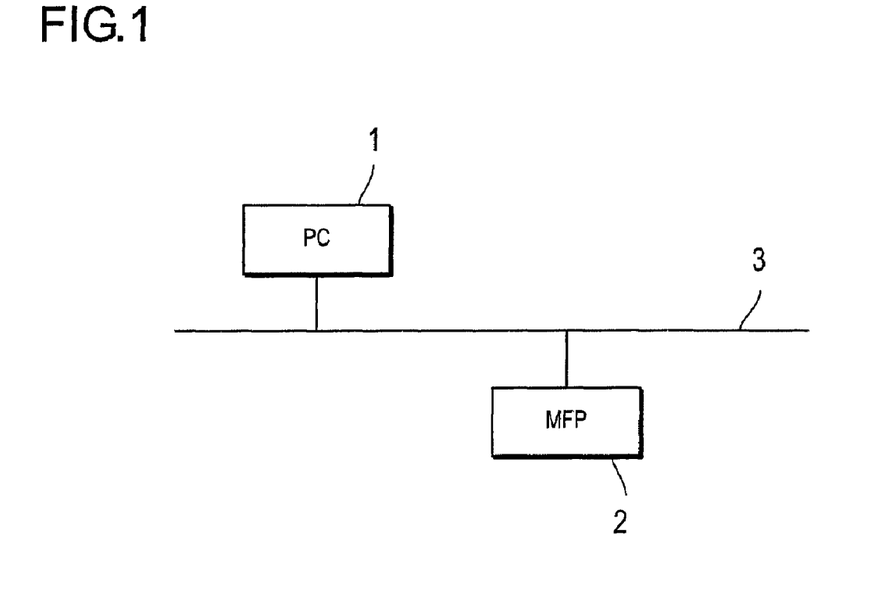
FIG. 1 is a block diagram showing the overall configuration of an image forming system according to an embodiment of the present invention.

FIG. 1 is a block diagram showing the overall configuration of an image forming system A according to an embodiment of the present invention. As shown in FIG. 1, the image forming system A according to the present embodiment includes a PC 1 as a client, and an Multiple Function Peripheral (MFP) 2 as a printer, which are connected via a communication network 3 for communication with each other. The type and the number of equipments to be connected to the communication network 3 are not limited to those shown in FIG. 1. The PC 1 can also be connected with MFP 2 directly (via a local connection) without an intervention by the communication network 3.

The configuration of each device will be described below while each of the devices can include any constituents other than those described later, and can include part of the constituents alone. Descriptions of any functions common to more than one device will be made only once, and will not be repeated thereafter for avoiding duplicate descriptions.

Figure 2:
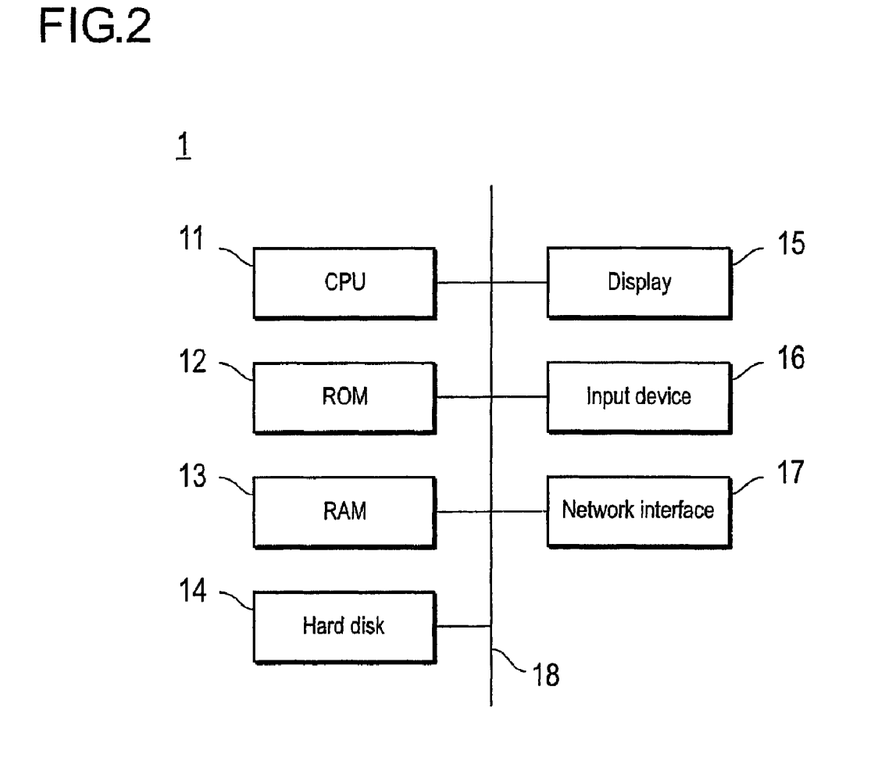
FIG. 2 is a block diagram showing the configuration of a PC 1 shown in FIG. 1.

FIG. 2 is a block diagram showing the configuration of PC 1 shown in FIG. 1. The PC 1 contains a CPU 11, a ROM 12, a RAM 13, a hard disk 14, a display 15, an input device 16 and a network interface 17, all of which are interconnected via a bus 18 for exchanging signals.

The CPU 11 controls various parts indicated above and executes various arithmetic processes according to a program. The ROM 12 stores various programs and data. The RAM 13 stores programs and data temporarily as a working area. The hard disk 14 stores various programs including an operating system and various data. In particular, a document creation application and a printer driver 4 are installed on the hard disk 14.

In the present embodiment, the printer driver 4 performs, as an image forming apparatus, the tasks of receiving data from an application to convert a document file for printing into print data written in a page description language (PDL) which is understandable to the MFP 2 (hereinafter also called "PDL data"), and integrating into the print data instructions regarding various print settings including those related to tab printing in order to create a print job. The printer driver 4 then transmits the print job to MFP 2 as a means of giving a printing instruction to the MFP 2. The printer driver 4 contains programs for performing such tasks as described above.

The display 15 can be LCD, CRT, and other types of displays, on which various kinds of information are displayed. The input device 16 includes a pointing device such as a mouse, a keyboard, and others, and is used for executing various kinds of information inputs.

The network interface 17 is an interface for data communication with other devices via the network 3, and can typically be a network interface using protocols like Ethernet (a registered trademark), Token Ring and FDDI.

Figure 3:
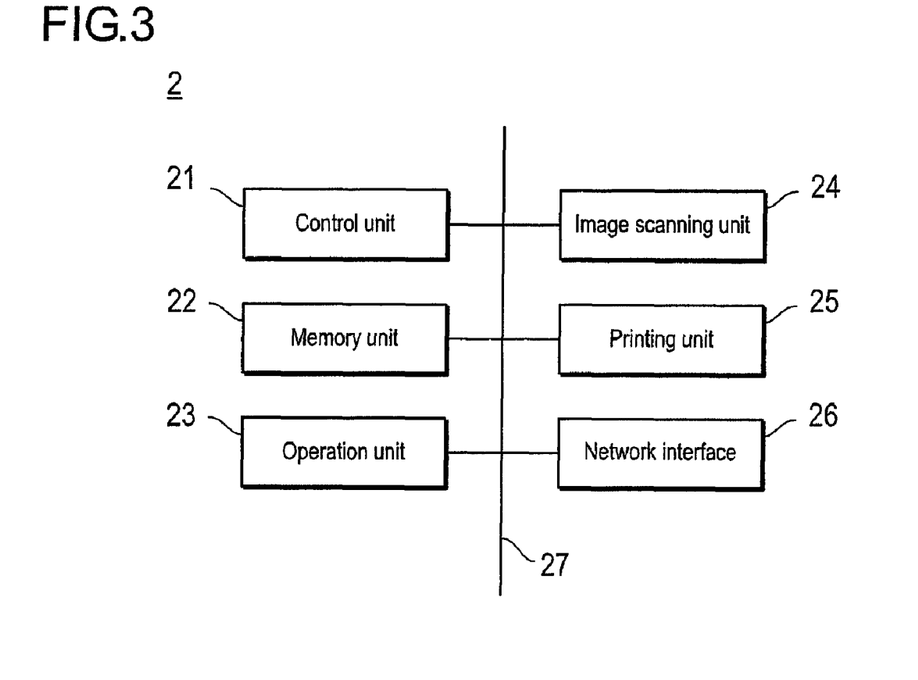
FIG. 3 is a block diagram showing the configuration of an MFP 2 shown in FIG. 1.

FIG. 3 is a block diagram showing the configuration of the MFP 2 serving as a printing apparatus according to the present embodiment. As shown in FIG. 3, the MFP 2 includes a control unit 21, a storage unit 22, an operation unit 23, an image scanning unit 24, a printing unit 25, and a network interface 26, all of which are interconnected via a bus 27 for exchanging signals. The MFP 2 of the present embodiment is provided with a so-called "tab printing function", which enables it to print images on tab paper as well as on regular paper. Tab paper herein means a sheet of paper having a rectangular main body, and a protruding tab formed at a certain position on the outer edge of the main body.

The control unit 21 is a CPU, and controls various parts indicated above and executes various arithmetic processes according to a program.

The memory unit 22 includes a ROM for storing various programs and parameters, a RAM for temporarily storing programs and data, a hard disk used for temporarily storing image data obtained through an image forming process, etc.

The operation unit 23 consists of a touch panel for displaying various information and receiving inputs on various settings, a ten key pad for receiving inputs of the number of copies to be printed and so forth, a start key for receiving an instruction to start an operation, a stop key for receiving an instruction to stop the operation, various other keys including a reset key for restoring defaults settings, various indicator lamps, etc.

The image scanning unit 24 performs the scanning operation which includes irradiating by a light source such as a fluorescent lamp, a document placed on a certain location by user or transported to a certain location by an ADF (Auto Document Feeder), converting the scanned image into electrical signals by means of a CCD image sensor or a CMOS image sensor to generate a bit-mapped image data for printing.

The printing unit 25 prints the image data on printing paper by means of the electronic photographing method which includes electrical charging, exposure, development, transfer and fixing processes, and discharges the printed paper to a tray. However, the printing method employed by the printing unit 25 in this invention is not limited to this, and other methods including the impact method, thermal transfer method, and inkjet method can be used in place of the electronic photography method. The printing unit 25 can print images both on a main body and a tab of tab paper fed by a paper feeding unit (not shown), using the tab printing function.

The network interface 26 is an interface for communications between the MFP 2 and external equipments, and can typically be a network interface using a protocol like Ethernet (a registered trademark), Token Ring and FDDI, a serial interface including USB and IEEE 1394, a parallel interface including SCSI and IEEE 1284, a wireless communication interface including Bluetooth (a registered trademark), IEEE 802.11, Home RF and IrDA, and a telephone circuit interface for connection with a telephone circuit.

The abovementioned configuration enable the MFP 2 to function as a printer for printing image data received from an external equipment, a scanner for scanning a document and transmitting the scanned image data to an external equipment, a copying machine for scanning a document and printing the scanned image, and a facsimile machine for receiving and transmitting image data through a telephone circuit. The MFP 2 can also have functions to exchange email messages with the network 3 and other communication equipments on the network 3 capable of exchanging email messages via the network 3, and to print out contents of an attached file to an e-mail message received.

Figure 4:
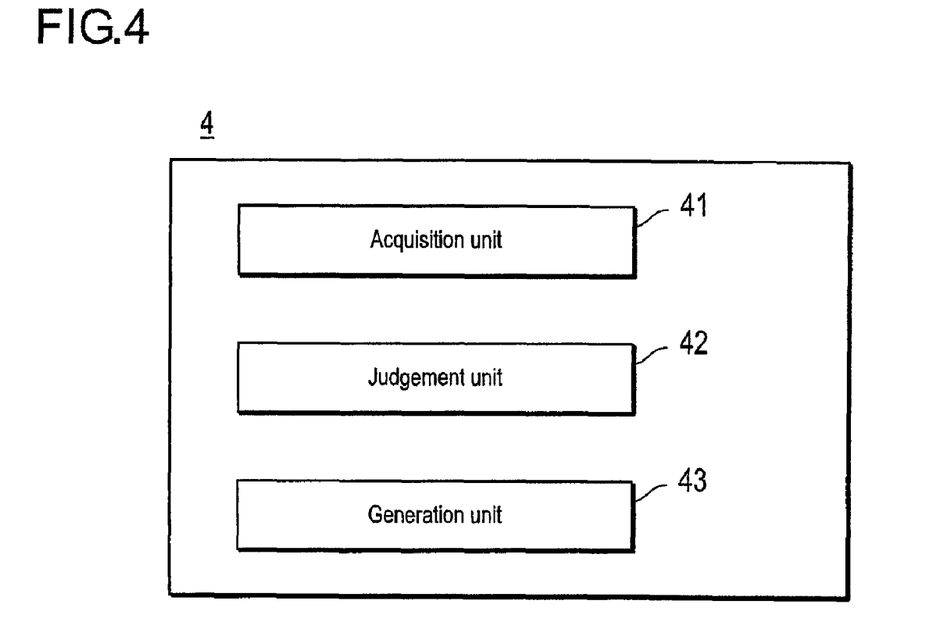
FIG. 4 is a block diagram showing the overall configuration of a printer driver 4 according to an embodiment of the present invention.

The configuration of the printer driver 4 in this embodiment will be described below. FIG. 4 is a conceptual diagram to show various functions provided with the printer driver 4 of this embodiment.

As shown in FIG. 4, the printer driver 4 of the present embodiment includes an acquisition unit 41 for acquiring instructions regarding various print settings, a judgement unit 42 for making certain judgements described later, and a generation unit 43 for generating a print job.

The acquisition unit 41 acquires instructions regarding various print settings including those on tab printing. For example, the acquisition unit 41 displays, on the display 15 of the PC 1, user interface screens (hereinafter called "UI screen") like those shown in FIG. 5 to FIG. 7, and acquires instructions regarding various print settings from user operating the PC 1. Details on the UI screens 5A to 5C are described later. User's instructions acquired by the acquisition unit 41 are referenced by the generation unit 43 when it generates a print job.

The judgement unit 42 makes various judgements for the purpose of achieving preferable printing results. For example, the judgement unit 42 makes a judgement on whether or not the information specified by user as an index to be printed on the tab (hereinafter called "index information") can fit into the tab. The details are given below with reference to the flowchart shown in FIG. 8. The results of the judgements by the judgement unit 42 are referred to by the generation unit 43 when it generates a print job.

The generation unit 43 converts a data file received from an application, into PDL data for printing, and then integrates into the PDL data various instructions regarding print settings with reference to the information provided by the acquisition unit 41 and the judgement unit 43, in order to generate a print job. The print job generated by the generation unit 43 is processed by the control unit 21 of the MFP 2 after its transmission from the PC 1 to the MFP 2 via the network 3, and this causes the printing unit 25 to print an image according to the print job on printing paper.

Figure 10:
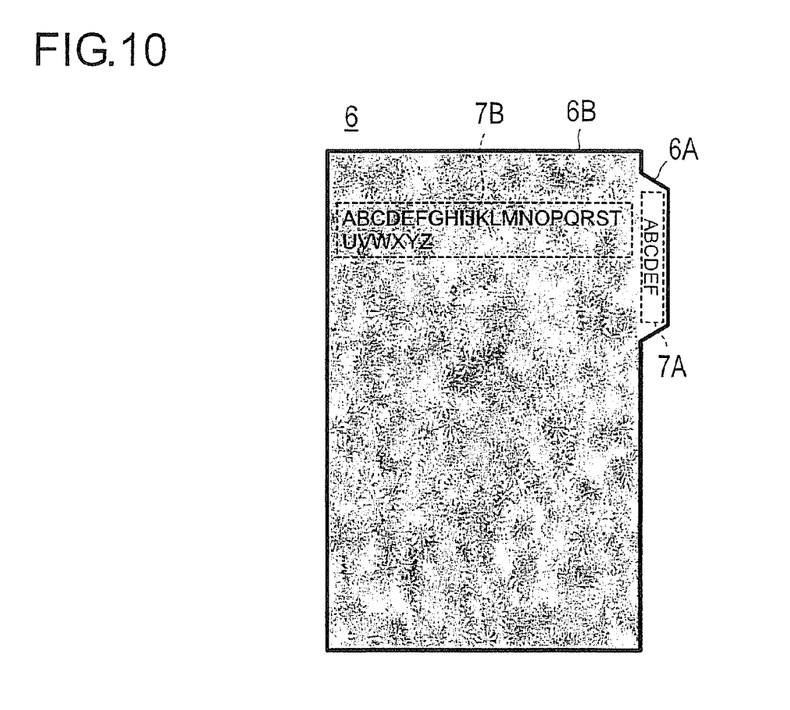
FIG. 10 is an example of a printing result on tab paper according to an embodiment of the present invention.

An example of the printing result on tab paper obtained by the image forming system A of the present embodiment is described below. FIG. 10 shows an example of the printing result on tab paper 6.

Figure 11:
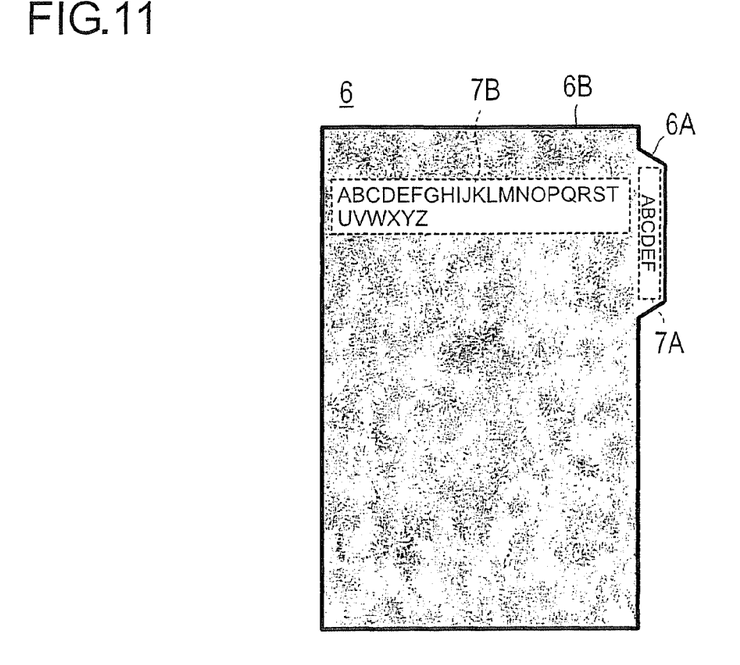
FIG. 11 is an example of a printing result on tab paper according to an embodiment of the present invention.

Referring to FIG. 10, the index information 7 specified by user as an index, is printed on tab paper 6, so that information composed of the initial part of the index information 7 that can fit into the tab 6A (hereinafter called "first index information 7A") will be printed on the tab 6A, and the information containing at least the remaining part of the index information 7 after depriving it of the first index information 7A (hereinafter called as second index information 7B) will be printed on the main body 6B. In an example shown in FIG. 10, the first index information 7A is a character string "ABC-DEF", and the second index information 7B is a letter string "ABCDEFGHIJKLMNOPQRSTUVWXYZ". The contents of the second index information 7B can be changed arbitrarily for the purpose of achieving better legibility of the information on the tab paper. For example, the second index information 7B can be the entirety of the index information 7 as shown in FIG. 10, or the remaining part of the index information 7 after depriving it of the first index information 7A as shown in FIG. 11.

Figure 5:
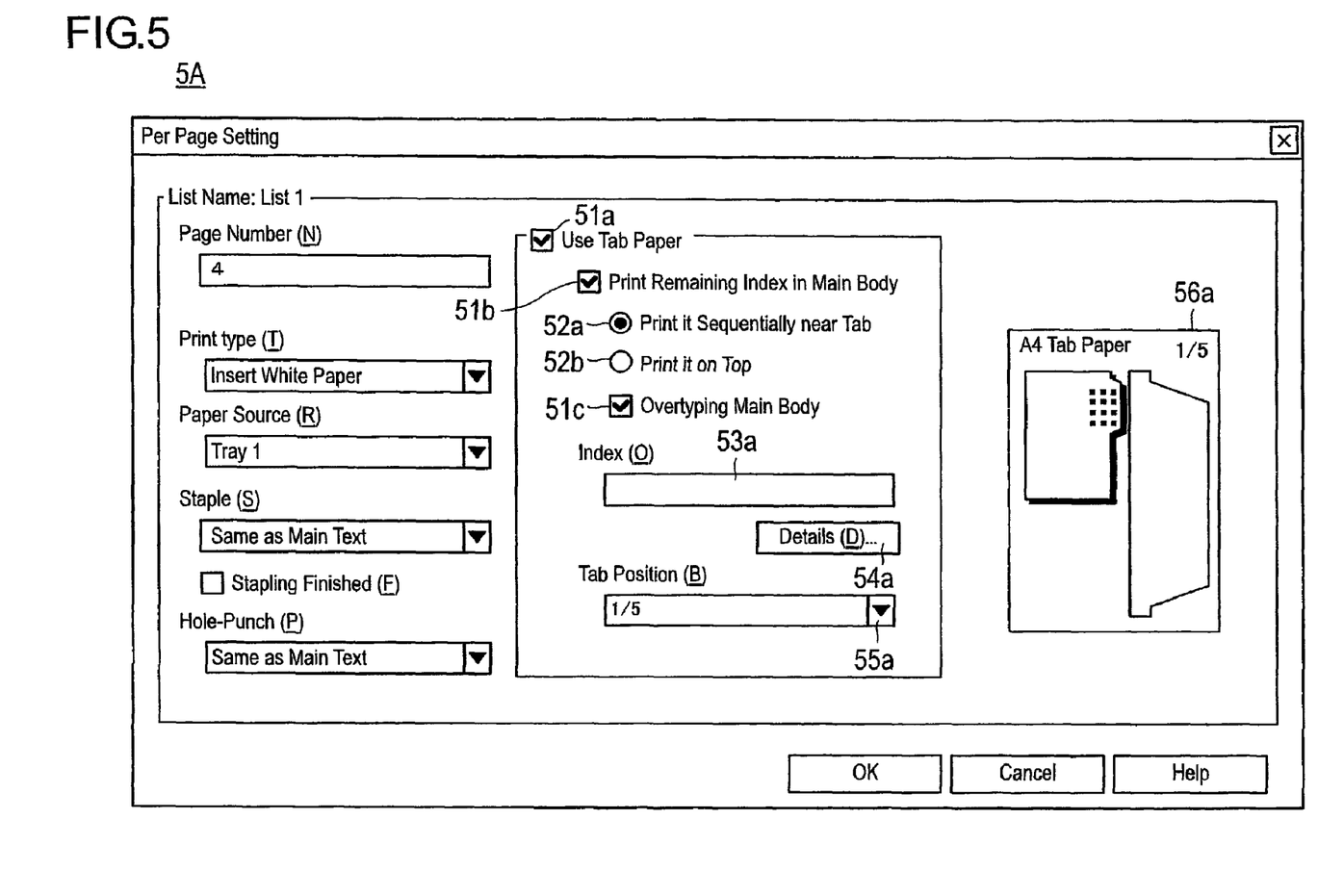
FIG. 5 is a diagram showing an example of an user interface (UI) screen 5A for Per Page Setting provided by the printer driver 4 according to an embodiment of the present invention.
Figure 6:
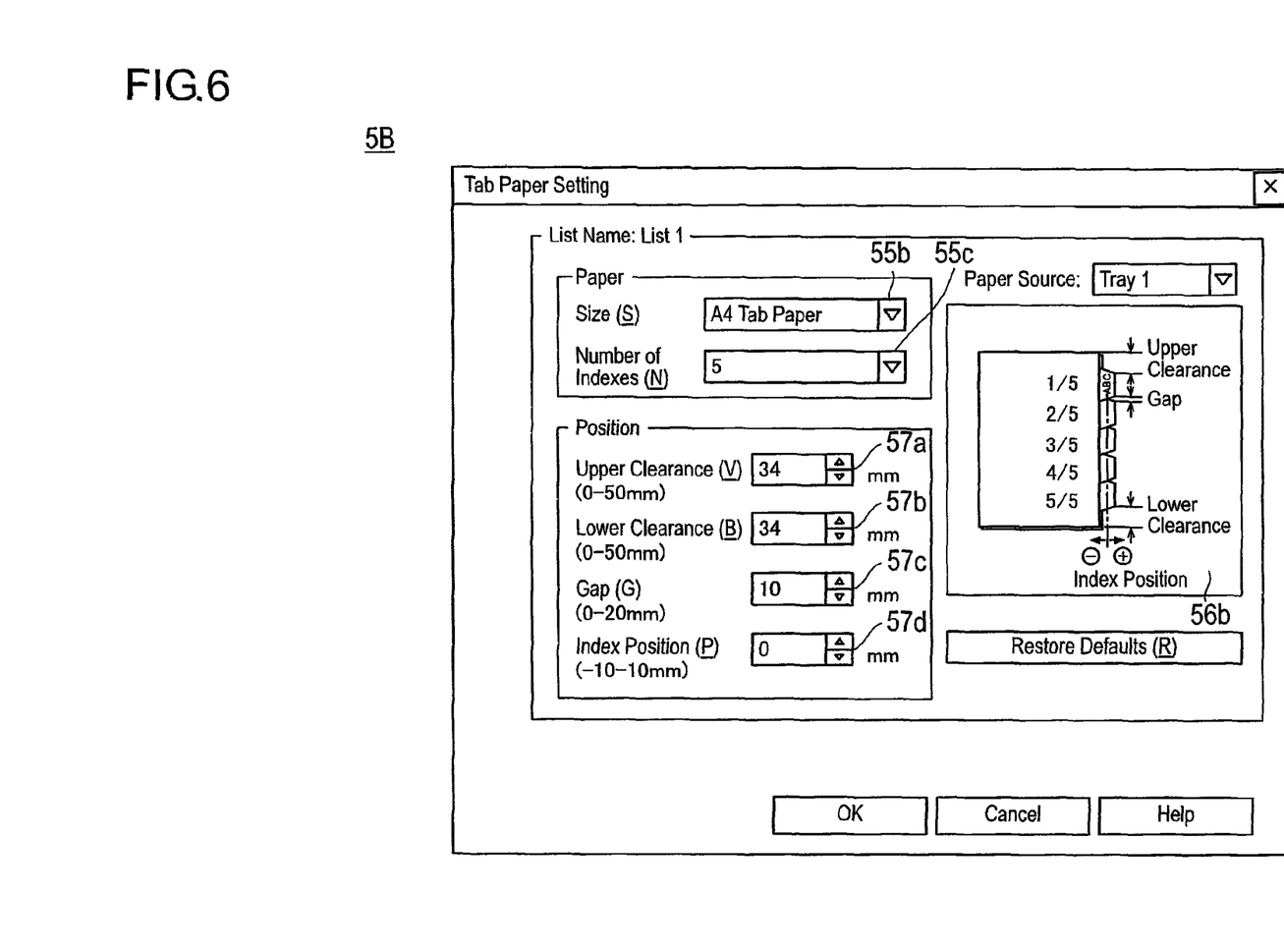
FIG. 6 is a diagram showing an example of an UI screen 5B for Tab Paper Setting provided by the printer driver 4 according to an embodiment of the present invention.
Figure 7:
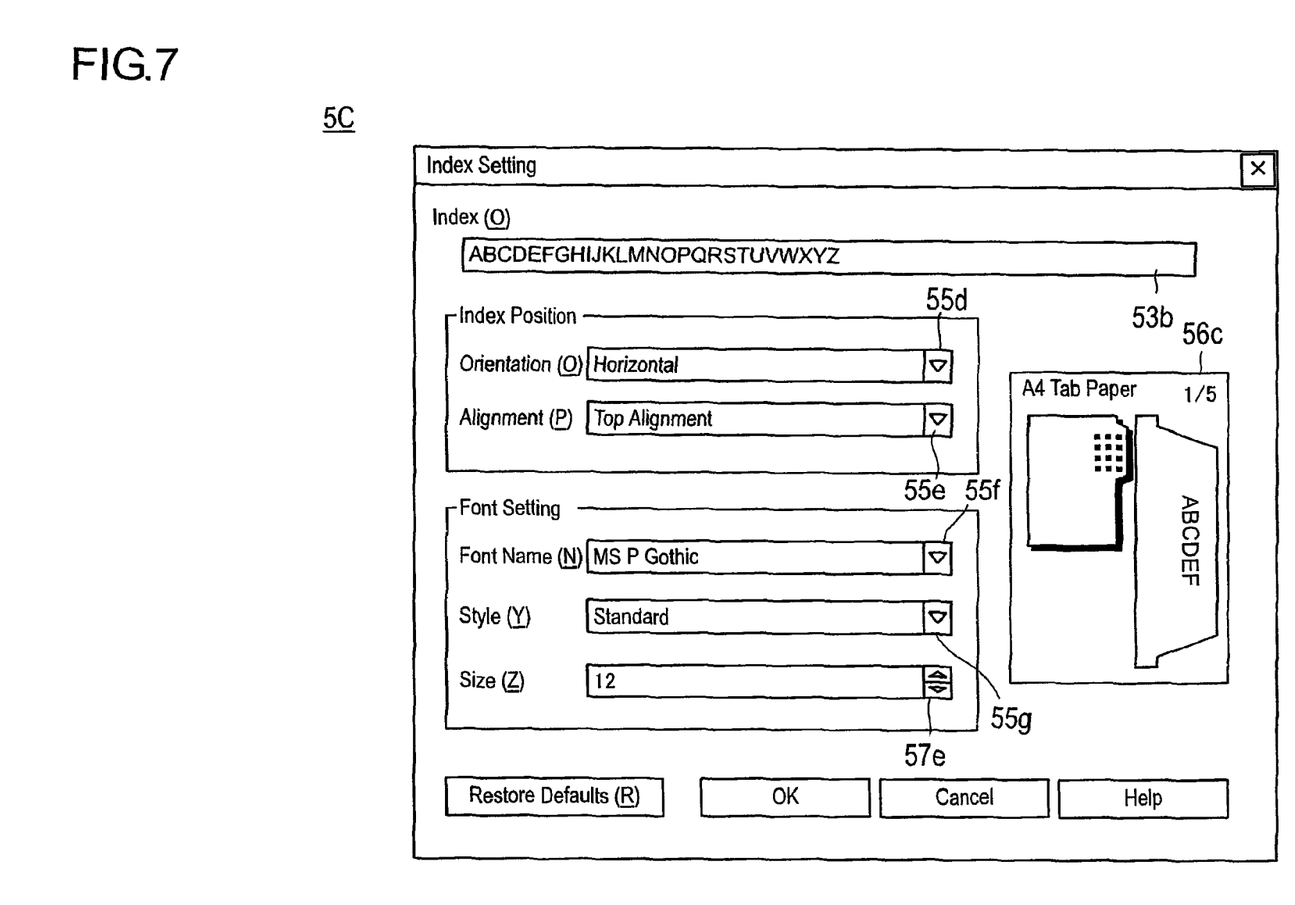
FIG. 7 is a diagram showing an example of an UI screen 5C for Index setting provided by the printer driver 4 according to an embodiment of the present invention.

The following is a description of the UI screens 5A to 5C displayed on the display 15 in order to allow the acquisition unit 41 of the printer driver 4 to acquire user's instructions regarding settings on tab printing. User can give their instructions regarding settings on tab printing by operating check box 51, radio button 52, text box 53, button 54, pull-down menu 55, and up/down button 57 provided on each UI screen, using the input device 16, etc.

FIG. 5 shows an example of the UI screen 5A for Per Page Setting. This example shows print settings for inserting tab paper stored in Tray 1 in blank (without printing on its main body) at the position right behind the 4th page of the print data. Details on how user can configure settings for tab printing, using the UI screen 5A are described as follows:

User can choose whether or not tab paper should be inserted in a printed document by marking the checkbox 51a. User can also choose whether or not the remaining part of the index (i.e. the second index information 7B) should be printed on the main body of the tab paper by marking the check box 51b.

User can choose whether or note the second index information 7B should be printed near the tab sequentially, or printed on the top of the main body, by clicking the radio buttons 52a, 52b. More specifically, user can choose printing the second index information 7B in an area within the main body adjacent to the tab so that the second index information 7B follows the index printed on the tab (i.e. first index information), by clicking the radio button 52a, and can choose printing the second index information on the top of the main body, by clicking the radio button 52b. User can also choose printing the second index information in an overtype mode i.e. overwriting images on the main body with the second index information, by checking the check box 51c.

User can also specify the index information to be printed on the tab, by entering its desired text in the text box 53a. By pressing the "Detail" button 54, user can also open the UI screen 5C for Index Setting as shown in FIG. 7. By selecting an item from the pull-down menu 55a, user can also specify the position of the tab on the tab paper to be used.

As shown in FIG. 5, the preview window 56 shows a print preview of the tab paper according to user's settings on the checkbox 51b, the radio buttons 52a, 52b, and the pull-down menu 55a. The preview image shown in FIG. 5 corresponds to the settings, "Print Remaining Index in Main Body", "Print it Sequentially near Tab" and "Tab Position ⅕".

FIG. 6 shows an example of the UI screen 5B for Tab Paper Setting. User in an attempt to use the tab printing function needs to operate this UI screen 5B to configure settings on the number of tabs, the position of each tab, etc. before giving an instruction to execute tab printing. More specifically, user needs to specify the size of the tab paper and the total number of tabs, by means of the pull-down menus 55b and 55c, respectively, and specify the length between the top of the tab paper and the top of the uppermost tab (i.e. upper clearance), the length between the bottom of the tab paper and the bottom of the lowermost tab (i.e. lower clearance), the length between adjacent indexes (i.e. gap), and the printing position of the index within the tab, by means of the buttons 57a, 57b, 57c and 57d, respectively. The preview window 56b displays a preview image of the tab paper in accordance with the settings specified by user on the UI screen 5B. The settings on the tab paper specified by user on the UI screen 5B are referred to for the judgement on whether or note the entire index information can fit into the tab.

FIG. 7 shows an example of the UI screen 5C for Index Setting. As can be seen in the above, the UI screen 5C pops up when user pushes the "Detail" button 54a in the UI screen 5A as shown in FIG. 5. User can specify settings on the index to be printed on the tab, by operating the UI screen 5C. More specifically, user can specify the index information by entering a text into the text box 53b, specify orientation, alignment, font and style of the index, by operating the pull-down menus 55*d*, 55*e*, 55*f* and 55*g*, respectively, and also specify size of the index, by operating the button 57*e*. The preview window 56*c* displays a preview image of the tab in accordance with the settings on index specified by user on the UI screen 5C.

Figure 8:
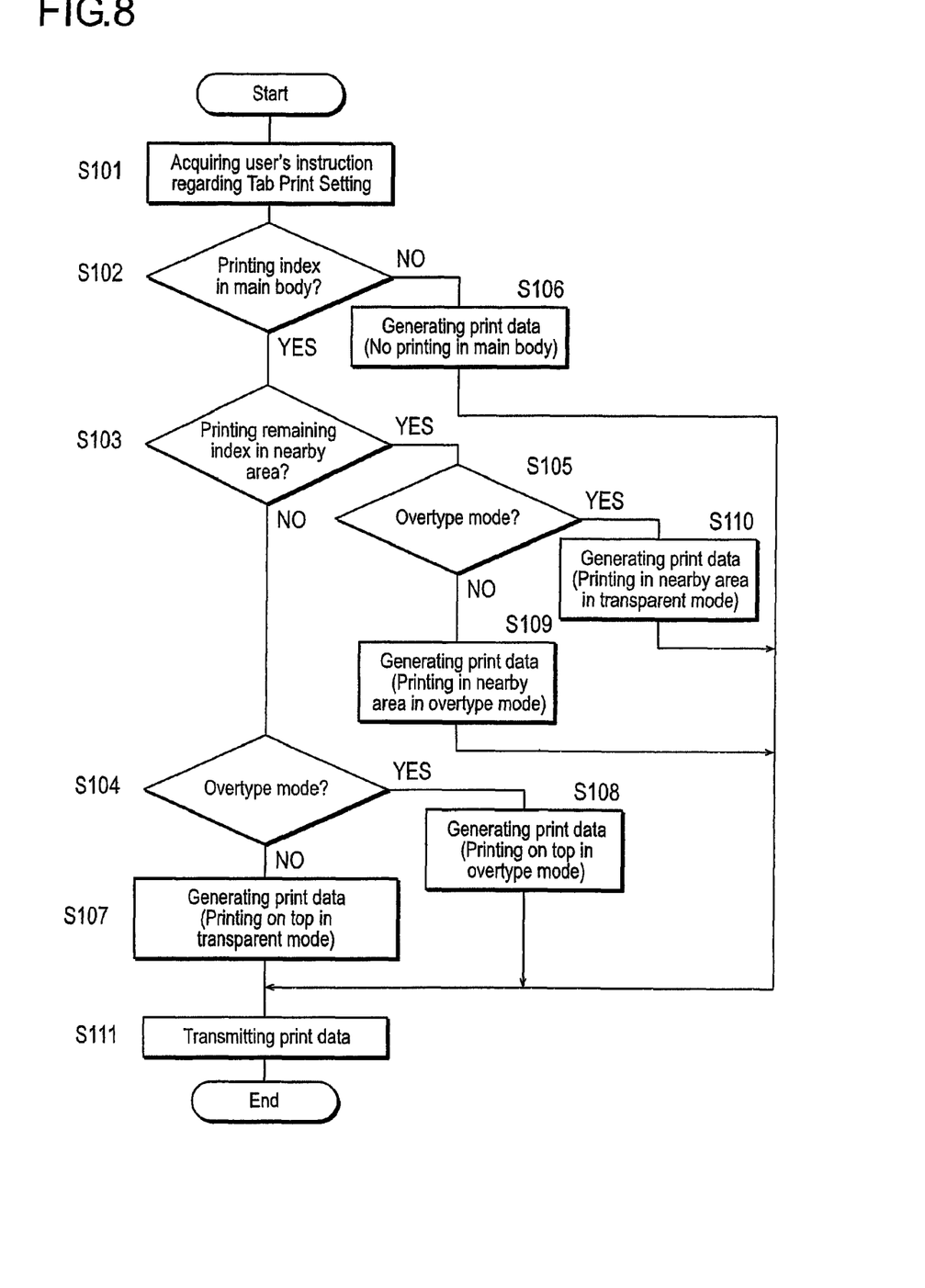
FIG. 8 is a flowchart showing the sequence of the process of the printer driver 4 according to an embodiment of the present invention.

The following is an outline of the operation performed by the printer driver 4 according to the present embodiment in the course of tab printing. FIG. 8 shows a flowchart of a sequence of steps executed by the printer driver 4 according to an embodiment of the present embodiment. The algorithm indicated by the flowchart of FIG. 8 is stored as a control program on the hard disk 14 of the PC 1, and is read out and executed by the CPU 11 when the operation starts.

First of all, the printer driver 4 acquires user's instructions regarding various settings on tab printing (S101). This step is executed by the aforementioned acquisition unit 41. The instructions acquired by the acquisition unit 41 include not only the settings on the size of the tab paper, the total number of the tabs and the index information to be printed on the tab, but also the settings on whether or not the second index information 7B should be printed on the main body, whether or not the second index information should be printed in the area adjacent to the tab so that it will follow the first index information 7A, and whether or not the second index information 7B should be printed on the main body in a overtype mode. In the present embodiment, the acquisition unit 41 of the printer driver 4 can acquire these instructions from user by means of the UI screens 5A to 5C displayed on the display 15 as shown in FIG. 5 to FIG. 7.

Subsequently, the printer driver 4 analyzes the instructions acquired in S101 to make a judgement on whether or not they state that the remaining part of the index information (i.e. the second index information) should be printed on the main body (i.e. whether or not the checkbox 51*b* in FIG. 5 is marked) (S102). This judgement is made by the aforementioned judgement unit 42. If the result of this judgement is negative (S102: No), the printer driver 4 generates the print data only for printing the first index information on the tab (S106). In this case, the second index information will not be printed on any part of the tab paper due to the absence of the instruction to print it on the main body. The generation of the print data in S106 is executed by the aforementioned generation unit 43.

On the other hand, result of the judgement in S102 is positive, the printer driver 4 further analyzes the instructions acquired in S101 to makes a judgement on whether or not they state that the second index information should be printed in an area adjacent to the tab so that it will follow the first index information (i.e. whether or not the radio button 52*a* in FIG. 5 is pressed) (S103). This judgement is also made by the aforementioned judgement unit 42.

If the result of the judgement in S103 is negative, the printer driver 4 further analyzes the instructions acquired in S101 to make a judgement on whether or not they states that the second index information 7B should be printed on the body in an overtype mode (i.e., whether or not the check box 51*c* in FIG. 5 is marked) (S104). This judgement is also made by the judgement unit 42.

If the result of the judgement in S104 is negative, the printer driver 4 generates print data for printing the first index information 7A on the tab and printing the entire index information 7 on the top of the main body in a transparent mode as the entire index information 7 is treated as the second index information 7B in this case (S107). If the result of the judgement in S104 is positive, the printer drive generates print data for printing the first index information on the tab and printing the entire index information 7 on the top of the main body in an overtype mode as the entire index information 7 is treated as the second index information 7B in this case (S108). This print data is also generated by the aforementioned generation unit 43.

If the result of the judgement in S103 is positive, the printer driver further analyzes the instructions acquired in S101 to make a judgement on whether or not they states that the second index information should be printed in the main body in an overwrite mode (i.e. whether or not the check box 51*c* in FIG. 5 is marked) (S105). If the result of the judgement in S105 is negative, the printer driver 4 treats the remaining part of the index information after depriving it of the first index information as the second index information, and generates print data for printing the first index information on the tab, and printing the remaining part of the index information in an area adjacent to the tab, in a transparent mode, so that the remaining part will follow the first index information 7A (S109). If the result of the judgement in S105 is positive, the printer driver treats the remaining part of the index information 7 after depriving it of the first index information 7A as the second index information 7B, and generates print data for printing the first index information 7 on the tab, and printing the remaining part of the index information in an area adjacent to the tab, in a transparent mode, so that the remaining part will follow the first index information 7 (S110). This print data is also generated by the aforementioned generation unit 43.

After generating print data in any one of the steps S106 to S110, the printer driver 4 transmits the generated print data to the MFP 2 (S110) to complete the series of steps. In the case when the destination MFP 2 cannot interpret PDL data, the printer driver 4 will needs to rasterize the print data before transmitting it to the MFP 2. The printer driver 4 executes the series of steps S101 to S110 for generating print data for one page, and repeats the series of steps until it generates print data for all the pages.

Printing results on tab paper 6 corresponding to the settings specified by user on the UI screens 5A to 5C according to this embodiment, will be shown below with reference to FIG. 9 to FIG. 13.

FIG. 9 to FIG. 13 show examples of the printing results on the tab paper 6 based on the print data generated in S106, S107, S108, S109 and S110 in the flowchart shown in FIG. 8, respectively. In each of the cases, the index information 7 specified by user is a letter string "ABCDEFGHIJIKLM-NOPQRSTUVWXYZ" as shown in FIG. 7.

Figure 9:
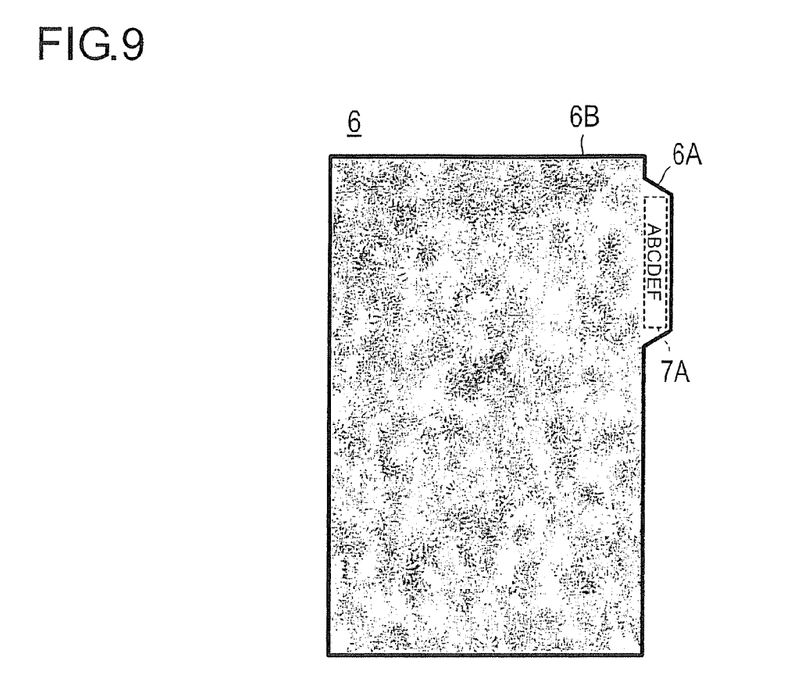
FIG. 9 is an example of a printing result on tab paper according to an embodiment of the present invention.

FIG. 9 shows an example of the printing result in the case where user does not intend to have the index information 7 printed on the main body 6B, as described in S106 of FIG. 8. In this case, the initial part of the index information 7 that can fit into the tab 6A i.e. the letter string "ABCDEF" is treated as the first index information 7A, and this first index information 7A is printed on the tab 6A of the tab paper 6. In this case, none of the index information 7 is printed on the main body 6B of the tab paper 6. In other words, this printing result is no different from the one that can be achieved by tab printing in the conventional art.

FIG. 10 shows an example of the printing result in the case where user intends to have the index information printed on the top of the main body 6B in a transparent mode as described in S107 of FIG. 8. In this case, the initial part of the index information 7 i.e. the letter string "ABCDEF" is treated as the first index information 7A to be printed on the tab 6A like in FIG. 9, and the entire index information 7 i.e. the letter string "ABCDEFGHIJIKLMNOPQRSTUVWXYZ" is treated as the second index information 7B to be printed on the top of the main body 6B in a transparent mode. In other words, user can have the entire index information 7 printed on the top of the main text 6B for its better legibility, by means of simple operations on the UI screens 5A to 5C involving no complex settings. The printing in a transparent mode will minimize adverse effects on any other images on the main body 6B.

FIG. 11 shows an example of the printing result in the case where user intends to haves the index information printed on the top of the main body 6B in an overtype mode as described in S108 of FIG. 8. In this case, the initial part of the index information 7 i.e. the letter string "ABCDEF" is treated as the first index information 7A to be printed on the tab 6A like in FIGS. 9 and 10, and the entire index information 7 i.e the letter string "ABCDEFGHIJIKLMNOPQRSTUVWXYZ" is treated as the second index information 7B to be printed on the top of the main body 6B in an overtype mode. In other words, user can have the entire index information 7 printed on the top of the main body 6B for its better legibility, by means of simple operations on the UI screens 5A to 5C involving no complex settings. Moreover, the printing in an overtype mode will effectively highlight the index information 7 relative to any other images on the main body 6B of tab paper 6.

Figure 12:
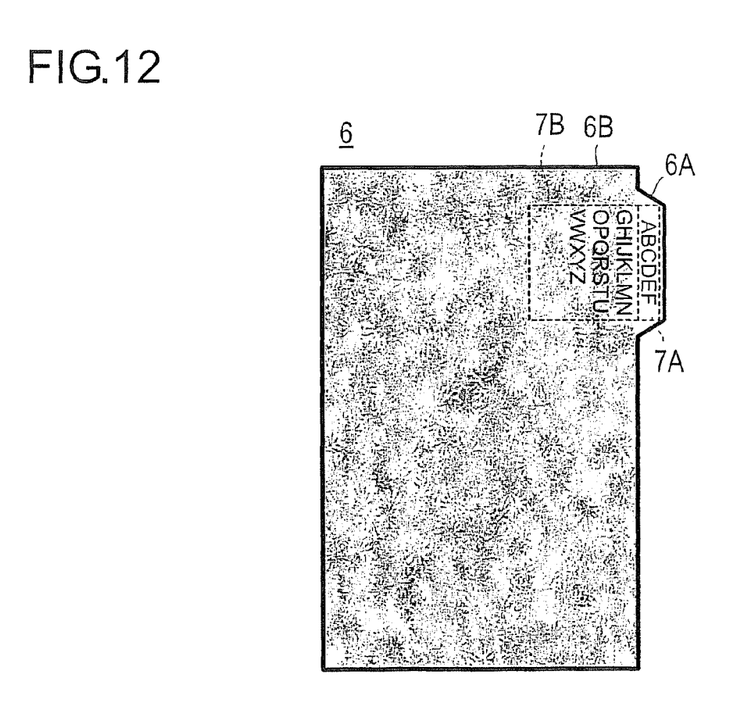
FIG. 12 is an example of a printing result on tab paper according to an embodiment of the present invention.

FIG. 12 shows an example the printing result in the case where user intends to have the index information printed sequentially on the tab and its adjacent area in a transparent mode as described in S109 of FIG. 8. In this case, the initial part of the index information 7 i.e. the letter string "ABCDEF" is treated as the first index information 7A to be printed on the tab 6A like in FIGS. 9 to 11, and the remaining part of the index information 7 after depriving it of the first index information 7A i.e. the letter string "GHIJIKLMNOPQRSTUVWXYZ" is treated as the second index information 7B to be printed on the main body 6B in a transparent mode. In other words, user can have the entire index information 7 printed on the tab 6A and the area within the main body 6B adjacent to the tab 6B for its better legibility, by means of simple operations on the UI screens 5A to 5C involving no complex settings. The printing in a transparent mode will minimize any adverse effects on other images on the main body 6B.

Figure 13:
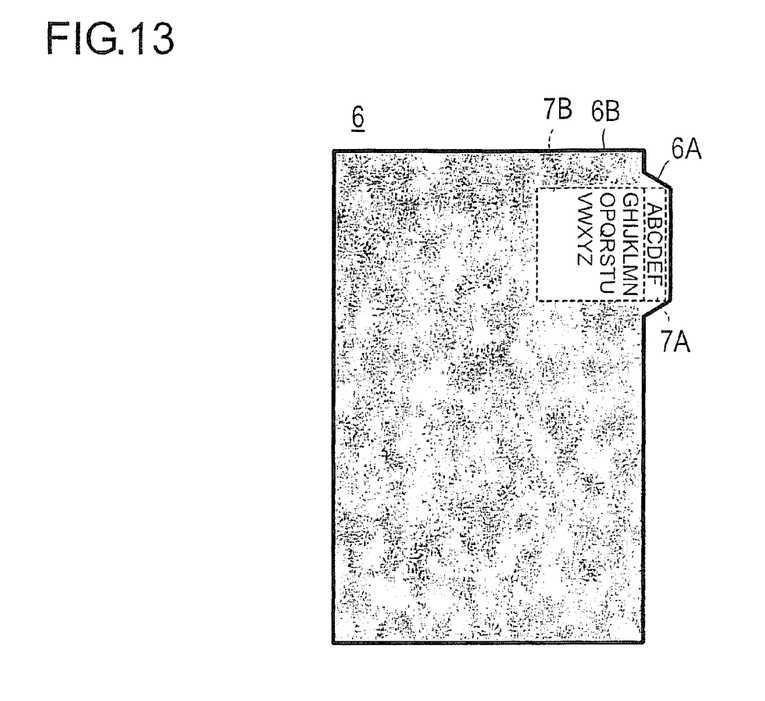
FIG. 13 is an example of a printing result on tab paper according to an embodiment of the present invention.

FIG. 13 shows an example of the printing result in the case where user intends to have the index information printed on the top of the main body 6B in an overtype as described in S110 of FIG. 8. In this case, the initial part of the index information 7 i.e. the letter string "ABCDEF" is treated as the first index information 7A to be printed on the tab like in FIGS. 9 to 12, and the entire index information 7 i.e. the letter string "ABCDEFGHIJKLMNOPQRSTUVWXYZ" is treated as the second index information 7B to be printed on the main body 6B in a overtype mode. In other words, user can have the entire index information 7 printed sequentially on the tab 6A and the adjacent area within the main body 6B for its better legibility, by means of simple operation on UI screens 5A to 5C involving no complex settings. Moreover, the printing in an overtype mode will effectively highlight the index information 7 relative to any other images on the man body 6B.

The following is a description of other variations according to the present embodiment. The printer driver 4 of the present embodiment can print on the tab 6A, the first index information 7A after having its fraction replaced by other information. The information replacing a fraction of the first index information 7A should preferably be information which can give user a sign of presence of the second index information 7B to be printed on the main body 6B, and can typically be a letter string like "(Cont.)", or marks like " . . . " and "-"

Figure 14:
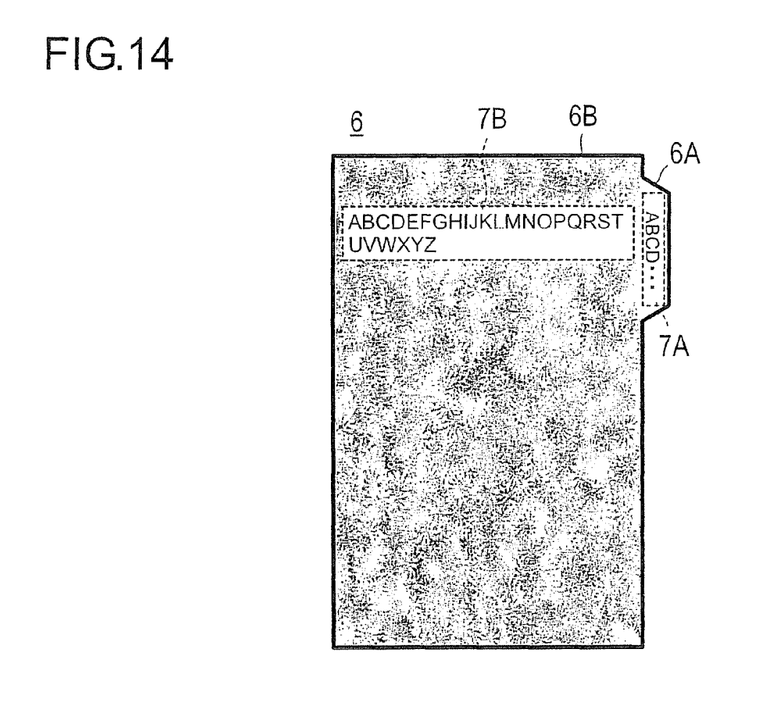
FIG. 14 is an example of a printing result on tab paper according to an embodiment of the present invention.

FIG. 14 shows an example of the printing result according these variations, where the first index information 7A after having its fraction replaced by the marks " . . . " i.e. the letter string "ABCD . . . " is printed on the tab 6A, and the entire index information 7 i.e. the letter string "ABCDEFGHIJKLMNOPQRSTUVWXYZ" is printed on the main body 6B. This printing result will allow user glancing at the index "ABCD . . . " to recognize that the tab paper 6 includes the second index information 7B printed on its main body 6B.

As can be seen from the above, this embodiment ensures that the first index information 7A composed of the initial part of the index information 7 that can fit into the tab 6A, will be accompanied by the second index information 7B containing at least the remaining part of the index information 7B to be printed on the main body 6B of the same tab paper 6. In other words, this embodiment will put into practice, the tab printing function to print user-specified index information 7 in an intact and legible manner, without user's trouble in complex settings. Consequently, this will eliminate user's need for time-consuming settings on the index to be printed on the tab 6A, and allows for improved user-friendliness in tab printing. Furthermore, this embodiment allows user to specify various settings on presence of the second index information 7B on the main body 6B, position of the second index information 7B, and printing mode for the second index information 7B, etc. by means of simple operations on the UI screens 5A to 5C provided by the printer driver 4, thereby improving further user-friendliness in tab printing.

The invention is not limited to the embodiment described above, but can be changed in various ways within the scope of the claims. For example, the printer driver 4 functioning as an image forming apparatus in the aforementioned embodiment, acquires the index information 7 to be printed on the tab sheet 6 by means of the UI screen 5C, but the present invention is not necessarily limited to this. More specifically, the image forming apparatus of the present invention can extract some information from data file for printing to use it as the index information. In this respect, if the information extracted from the data file should originally be printed on the main body of the same tab paper, the system is preferably configured so that the information extracted will be prohibited from being printed on the main body, for the purpose of avoiding it from being printed redundantly on the same paper.

The aforementioned embodiment of the present invention causes the printer driver 4 installed on the PC 1 serving as a client, to acquire the index information 7 as well as various other settings for tab printing and to create print data of a document file for tab printing, but the present invention is not limited to this. For example, the present invention can also cause the operation unit 23 of the MFP 2 serving as a printer to acquire the index information 7 and various other settings, and cause the image scanning unit to scan a document for tab printing unit 24.

The functional units and methods for executing various processes within the image forming system A according to the present invention can be materialized by means of a dedicated hardware circuit, or a programmed computer. The abovementioned program can be provided in the form of a computer-readable storage medium such as a flexible disk or a CD-ROM. In this case, the program recorded on the computer readable recording medium is ordinarily transferred to and stored in a memory unit such as a hard disk. This program can also be provided as independent application software or can be built into a software installed on the image processing apparatus to exert part of its functions.

What is claimed is:

1. An image forming method for printing on a single sheet of tab paper which has a main body for a text and a tab for an index, comprising the steps of:

1) acquiring index information on the index to be printed on said tab of said single sheet of tab paper;
2) generating print data for printing said index information acquired in said step 1) on said single sheet of tab paper, wherein said generated print data ensures that first index information composed of the initial part of said index information that can fit into said tab of said single sheet of tab paper, will be printed on said tab of said single sheet of tab paper, and second index information comprising the part of said index information that cannot fit into said tab of said single sheet of tab paper, will be printed on said main body of said single sheet of tab paper; and
3) printing said index information on said single sheet of tab paper,
wherein, in said step 3), the first index information is printed on said tab of said single sheet of tab paper, and the second index information is printed on said main body of said single sheet of tab paper.

2. The image forming method as claimed in claim 1, wherein
in said step 3), said second index information is printed on the top of said main body of said single sheet of tab paper.

3. The image forming method as claimed in claim 1, wherein
in said step 3), said second index information is printed in an area within said main body of said single sheet of tab paper adjacent to said tab of said single sheet of tab paper so that said second index information will follow said first index information.

4. The image forming method as claimed in claim 1, wherein
in said step 3), said first index information is printed after having its fraction replaced by other information that can give user a sign of presence of said second index information.

5. The image forming method as claimed in claim 1, wherein
in said step 3), said second index information is printed on said main body of said single sheet of tab paper in an overtype mode.

6. The image forming method as claimed in claim 1, wherein
in said step 3), said second index information is printed in said main body of said single sheet of tab paper in a transparent mode.

7. A non-transitory computer readable recording medium stored with a program for generating print data for printing on a single sheet of tab paper which has a main body for a text and a tab for an index, causing a computer to execute a process comprising the steps of:
1) acquiring index information on the index to be printed on said tab of said single sheet of tab paper;
2) generating print data for printing said index information acquired in said step 1) on said single sheet of tab paper, wherein said print data generated in said step 2) ensures that first index information composed of the initial part of said index information that can fit into said tab of said single sheet of tab paper, will be printed on said tab of said single sheet of tab paper, and second index information comprising the part of said index information that cannot fit into said tab of said single sheet of tab paper, will be printed on said main body of said single sheet of tab paper.

8. The non-transitory computer readable recording medium as claimed in claim 7, wherein
said print data generated in said step 2) further ensures that said second index information will be printed on the top of said main body of said single sheet of tab paper.

9. The non-transitory computer readable recording medium as claimed in claim 7, wherein
said print data generated in said step 2) further ensures that said second index information will be printed in an area within said main body of said single sheet of tab paper adjacent to said tab of said single sheet of tab paper so that said second index information will follow said first index information.

10. The non-transitory computer readable recording medium as claimed in claim 7, wherein
said print data generated in said step 2) further ensures that said first index information will be printed after having its fraction replaced by other information that can give user a sign of presence of said second index information.

11. The non-transitory computer readable recording medium as claimed in claim 7, wherein
said print data generated in said step 2) further ensures that said second index information will be printed on said main body of said single sheet of tab paper in an overtype mode.

12. The non-transitory computer readable recording medium as claimed in claim 7, wherein
wherein said print data generated in said step 2) further ensures that said second index information will be printed on said main body of said single sheet of tab paper in a transparent mode.

13. An image forming apparatus for printing on a single sheet of tab paper which has a main body for a text and a tab for an index, comprising:
an acquisition unit for acquiring index information on the index to be printed on said tab of said single sheet of tab paper; and
a generation unit for generating print data for printing said index information acquired by said acquisition unit on said single sheet of tab paper,
wherein said print data generated by said generation unit ensures that first index information composed of the initial part of said index information that can fit into said tab of said single sheet of tab paper, will be printed on said tab of said single sheet of tab paper, and second index information comprising the part of said index information that cannot fit into said tab of said single sheet of tab paper, will be printed on said main body.

14. The image forming apparatus as claimed in claim 13, wherein
said print data generated by said generation unit further ensures that said second index information will be printed on the top of said main body.

15. The image forming apparatus as claimed in claim 13, wherein
said print data generated by said generation unit further ensures that said second index information will be printed in an area within said main body of said single sheet of tab paper adjacent to said tab of said single sheet of tab paper so that said second index information will follow said first index information.

16. The image forming apparatus as claimed in claim 13, wherein
said print data generated by said generation unit further ensures that said first index information is printed after having its fraction replaced by other information that can give user a sign of presence of said second index information.

17. The image forming apparatus as claimed in claim 13, wherein said print data generated by said generation unit further ensures that said second index information will be printed on said main body of said single sheet of tab paper in an overtype mode.

18. The image forming apparatus as claimed in claim 13, wherein said print data generated by said generation unit further ensures that said second index information will be printed on said main body of said single sheet of tab paper in a transparent mode.

\* \* \* \* \*